(12) United States Patent
Kokkinen

(10) Patent No.: US 7,006,528 B1
(45) Date of Patent: Feb. 28, 2006

(54) METHOD ARRANGEMENT AND RECEIVER FOR ESTABLISHING CONNECTIONS IN A MULTIPLE-PROTOCOL COMMUNICATIONS NETWORK

(75) Inventor: Heikki Kokkinen, Helsinki (FI)

(73) Assignee: Nokia Technology GmbH, Bochum (DE)

( * ) Notice: Subject to any disclaimer, the term of this patent is extended or adjusted under 35 U.S.C. 154(b) by 0 days.

(21) Appl. No.: 09/261,017

(22) Filed: Mar. 2, 1999

(30) Foreign Application Priority Data

Mar. 6, 1998 (FI) .......................................... 980515

(51) Int. Cl.
    *H04J 3/16* (2006.01)
(52) U.S. Cl. ..................................... 370/467; 370/522
(58) Field of Classification Search ................ 370/522, 370/395.2, 524, 525, 466, 467, 465, 410, 370/395.53, 400, 401, 230, 239, 220.01; 379/230, 229, 220, 220.01
    See application file for complete search history.

(56) References Cited

U.S. PATENT DOCUMENTS

| | | | |
|---|---|---|---|
| 5,509,121 A | | 4/1996 | Nakata et al. |
| 5,535,334 A | | 7/1996 | Merkley et al. |
| 5,586,117 A | | 12/1996 | Edem et al. |
| 5,930,264 A | * | 7/1999 | Nguyen ...................... 370/466 |
| 6,034,949 A | * | 3/2000 | Gellhaus et al. ............. 370/252 |
| 6,058,115 A | * | 5/2000 | Sawyer et al. ............... 370/401 |
| 6,122,287 A | * | 9/2000 | Ohanian et al. ............. 370/465 |
| 6,154,458 A | * | 11/2000 | Kudoh et al. .......... 370/395.53 |
| 6,205,148 B1 | * | 3/2001 | Takahashi et al. .......... 370/401 |

* cited by examiner

*Primary Examiner*—Chi Pham
*Assistant Examiner*—Alexander O. Boakye

(57) ABSTRACT

A communications system comprises a central unit (101) and terminals (102, 103, 104). It is equipped so as to establish and maintain a signaling connection between the central unit and at least one terminal using one of at least two alternative signaling protocols. To that end it comprises in the central unit a device for indicating to a terminal the signaling protocols supported by the central unit, and a device for setting up via the central unit's network interface a signaling connection between the central unit's signaling unit and the terminal, using a selected signaling protocol. Correspondingly, in the terminal the system comprises a device for indicating to the central unit the signaling protocol supported by the terminal in response to a message sent by the central unit as well as a device for setting up via the terminal's network interface a signaling connection between the terminal's signaling unit and the central unit, using a protocol supported by the terminal.

11 Claims, 3 Drawing Sheets

Figure 1:
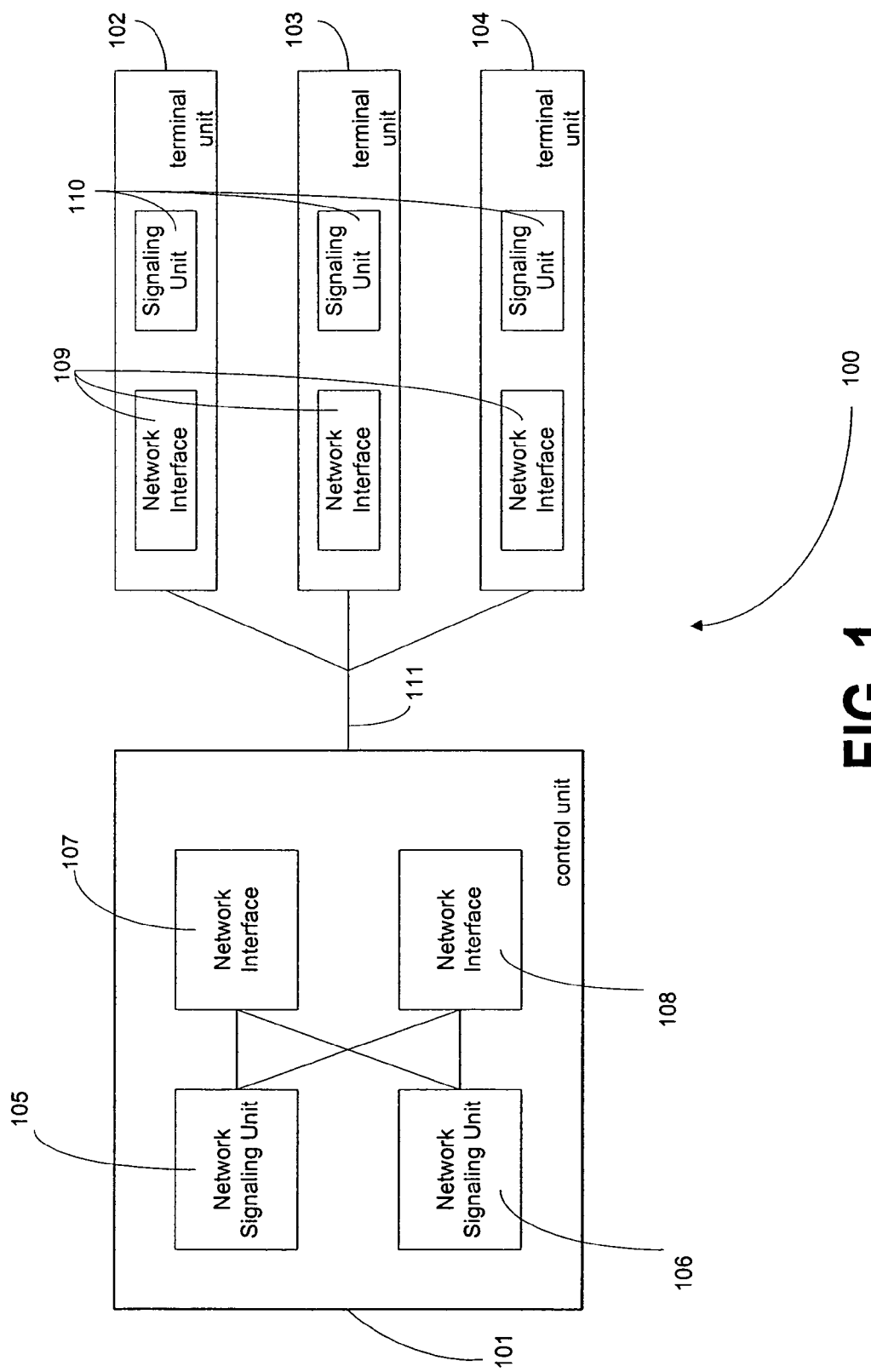

METHOD ARRANGEMENT AND RECEIVER FOR ESTABLISHING CONNECTIONS IN A MULTIPLE-PROTOCOL COMMUNICATIONS NETWORK

TECHNICAL FIELD

The invention relates to establishing a signaling connection between a central unit and a terminal unit in a communications system wherein the central unit and the terminal unit does not know in advance each other's capability of supporting various signaling protocols.

BACKGROUND OF THE INVENTION

At its simplest a multiple access network comprises one central unit and a plurality of terminal units each of which can at times be in a unidirectional or bi-directional signaling connection with the central unit. Typical future multiple access networks include networks that are being developed in order to replace the current cable TV networks and in which the physical connection between the central unit and terminal units may be based e.g. on cable, optical fiber, a combination of those (hybrid fiber coax, HFC), satellite links, terrestrial radio links, local multipoint distribution system (LMDS) or microwave multipoint distribution system (MMDS). For connection management, there are several protocols available. For simplicity, the connection management protocol can be called by a generic name CC (call/connection control).

With a point-to-point connection the connection management protocols are considerably simpler. However, since the transmission medium is common to the whole multiple access network, a special medium access control (MAC) protocol is needed below the CC in the transmission protocol hierarchy to extract a logical point-to-point channel from the capacity offered by the common transmission medium. In the open systems interconnection (OSI) model, MAC is a sub-layer of the second, i.e. data link, layer and CC is a protocol of the third, or network, layer.

Because of the multitude of protocols and hardware and software manufacturers it is possible that one wants to have in one and the same multiple access network devices that support different protocols. Then one is faced with the problem of implementing the signaling between the devices. A known solution is to install in the network or in connection with devices connected to the network protocol converters to carry out the necessary conversions between protocols. However, acquisition and installation of various accessories in the communications system is disadvantageous from the usability standpoint and protocol conversions also involve factors of uncertainty.

SUMMARY OF THE INVENTION

An object of the present invention is to provide a method, system and the required apparatus with which the problem caused by different CC protocols in a multiple access network can be solved. A particular object of the invention is that the solution according to the invention does not limit the number of usable protocols and does not exclude the possibility of creating wholly new protocols.

The objects of the invention are achieved by including at least in the central unit means for using a certain CC protocol or several mutually alternative CC protocols and by realizing at MAC level negotiation between a terminal unit and the central unit about the CC protocol used in the connection.

The central unit according to the invention is characterized in that it is equipped so as to use at least one signaling protocol in a signaling connection with a terminal unit of a communications system, to which end it comprises means for indicating to the terminal unit the signaling protocols supported by the central unit and means for establishing through a network interface in the central unit a signaling connection between a signaling unit in the central unit and the terminal unit, using the signaling protocol chosen.

The invention also pertains to a terminal unit which is characterized in that it is equipped so as to use in a signaling connection with a central unit of a communications system at least one signaling protocol, to which end it comprises means for indicating to the central unit in response to a message sent by the central unit the capability of the terminal unit of supporting a particular signaling protocol, and establishing through a network interface in the terminal unit a signaling connection between a signaling unit in the terminal unit and the central unit, using a signaling protocol supported by the terminal unit.

The invention also pertains to a communications system characterized in that it comprises a central unit like the one described above and at least one terminal unit like the one described above.

Furthermore, the invention pertains to a method characterized in that it comprises steps in which by means of communication between the central unit's network interface and a terminal unit's network interface information is created about the signaling protocol supported by the terminal unit, and signaling is started using a signaling unit in the central unit that supports the same signaling protocol as the terminal unit.

In accordance with the invention a central unit has one or more network signaling units and one or more network interfaces. A terminal unit typically has one signaling unit and one network interface. Before a point-to-point connection at MAC level is established between the central unit and a terminal unit, as required for a signaling connection, the central unit's network interface indicates to the terminal unit's network interface the protocol options available. The central unit may support one signaling protocol only or several alternative signaling protocols. The terminal unit's network interface selects a protocol and indicates its selection to the central unit's network interface which creates a logical connection with the right network signaling unit in the central unit on the one hand and with the network interface in the terminal unit on the other hand. If there exists in the terminal unit no logical connection between the network interface and the signaling unit, one is created, whereafter the entire logical connection from the central unit's network signaling unit via the network interfaces to the terminal unit's signaling unit is complete and signaling can proceed using the selected protocol. The invention does not limit the setup or release of other simultaneous connections between above-mentioned units or elsewhere in the network.

BRIEF DESCRIPTION OF THE INVENTION

Figure 2:
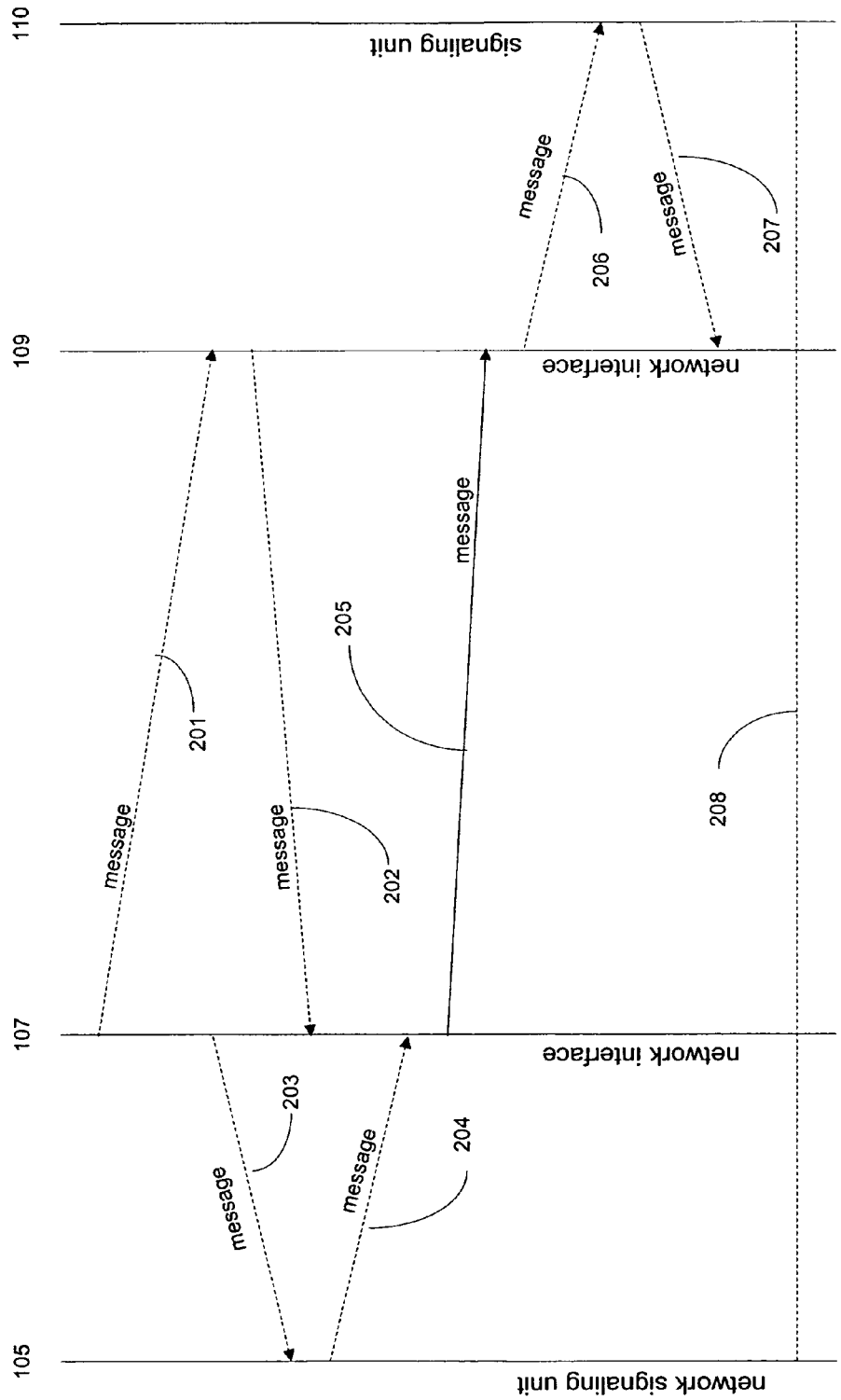
Figure 3:
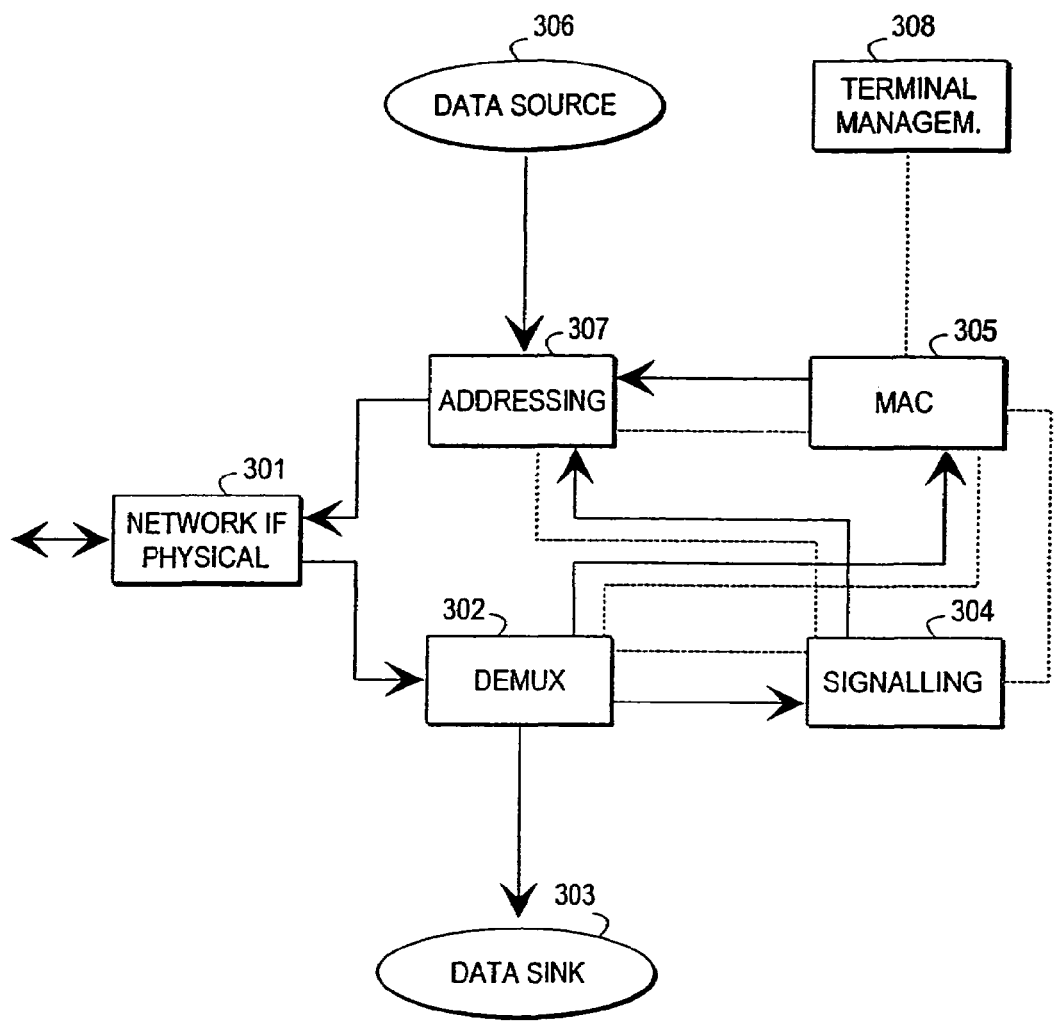

The invention will now be described in more detail with reference to the preferred embodiments presented by way of example and to the accompanying drawing wherein FIG. 1 shows a communications system according to the invention, FIG. 2 shows the principle of the invention in the system of FIG. 1, and FIG. 3 shows an apparatus according to the invention.

Like elements in the drawing are denoted by like reference designators.

BEST MODE FOR CARRYING OUT THE INVENTION

FIG. 1 shows a communications system 100 including a central unit 101 and a plurality of terminal units 102, 103 and 104. In this case the central unit has two network signaling units 105 and 106 and two network interfaces 107 and 108. Their mutual connections can be arranged in such a manner that any network signaling unit can use any network interface. Each terminal unit has a network interface 109 and a signaling unit 110. The central unit 101 is connected with the terminal units 102, 103 and 104 via a physical transmission medium 111, which may be one of the transmission media mentioned above in the description of the prior art. The connection between a given signaling unit and the transmission medium is always routed via a certain network interface.

Let us assume that a signaling connection is required between a central unit 101 and terminal unit 102 using the network interface 107 in the central unit and the network interface 109 in the terminal unit. FIG. 2 illustrates the exchange of messages between the different units in accordance with a preferred embodiment of the invention. Message 201 is used by the central unit's network interface 107 to indicate to the terminal unit's network interface 109 which signaling protocols are supported by the central unit. In response, the terminal unit's network interface 109 sends message 202 indicating the protocol chosen by the terminal unit. Messages 203 and 204 represent the establishment of a connection in the central unit between the network interface 107 and a network signaling unit that supports the protocol chosen by the terminal unit. In the case depicted by FIG. 2, this is network signaling unit 105.

Message 205 represents the establishment of a logical point-to-point connection according to the MAC protocol. In FIG. 2 it is assumed that the connection between the terminal unit's network interface 109 and the signaling unit 110 is established only when the establishment of the logical point-to-point connection has proceeded from the central unit's network signaling unit 105 to the terminal unit's network interface 109. The last section of the connection is established between the network interface 109 and signaling unit 110, represented by messages 206 and 207. When the logical point-to-point connection between the network signaling unit 105 and signaling unit 110 has been set up, signaling is carried out through it as depicted by arrow 208. When signaling is performed between CC protocol layers, the lower protocol layers, such as MAC, are transparent, i.e. the CC protocol need not take them into account in its operation. In FIG. 2, messages represented by continuous lines belong to the MAC protocol layer and messages represented by broken lines do not.

Above we only discussed the setup of a signaling connection initiated by a central unit. The invention is also applicable to the setup of a signaling connection initiated by a terminal unit. Adapting from FIG. 2, this can be illustrated by mirroring all messages in FIG. 2 with respect to the vertical centerline of the figure.

There are many functions on which a central unit and a terminal unit should be able to negotiate and signaling protocol support is only one of such functions related to connection setup and/or maintenance. It is very likely that in multiple access networks the situation regarding many other functions will eventually be similar: there is a number of mutually alternative ways of realizing a particular function related to connection setup and/or maintenance and the central unit and terminal units cannot know in advance which of the alternative ways the other party of the connection supports. The present invention can then be generalized according to the principles described below.

As regards the invention, it is advantageous that a certain list of codes and related values can be conveyed in messages according to the MAC layer. The invention does not limit these codes and their allowed values. In accordance with a preferred embodiment of the invention a given code is reserved to mean a desired characteristic related to connection setup and/or maintenance, such as call setup, control signaling and so on. Each code is then associated with a value that can be e.g. a one-byte signless integer. This kind of value definition has an obvious connection with the hardware implementation: when a certain number of bytes (say, one) is reserved for the value, it is easy to handle the value in the device by storing it in a particular register. A characteristic related to connection setup and/or maintenance which has alternative ways of implementation can be called a capability in general.

An advantageous way of linking together the code value and the information about the support for a certain alternative way of implementation (e.g. information indicating that a particular protocol is supported) is to assign a certain bit of the value to each certain alternative way of implementation. If the value of the bit is zero, it means the implementation in question is not supported, and if the value is one, it signifies that the implementation in question is supported. The invention does not rule out any other procedure to indicate whether a given way of implementation is supported or not.

Let us assume that code 0x81 is reserved to indicate the support for signaling protocols so that in accordance with a known convention the first part 0x means that the last part 81 is a hexadecimal number. Then, the selection of values related to the code can be carried out e.g. according to the table below.

TABLE 1

| Code | Protocol supported | Value |
|------|-------------------|-------|
| 0x81 | (none) | 0x00 |
|      | Q.2931 | 0x01 |
|      | PPP | 0x02 |
|      | bootp | 0x04 |
|      | DSM-CC U-N | 0x08 |
|      | other protocol 1 | 0x10 |
|      | other protocol 2 | 0x20 |
|      | other protocol 3 | 0x40 |
|      | other protocol 4 | 0x80 |

The table shows that the value related to code 0x81 is a certain one-byte (i.e. 8-bit) number. If the least significant bit of the byte is set (i.e. 1), the protocol supported is Q.293 1. If the second least significant bit is set, the protocol supported is PPP and so forth. A central unit may support one protocol only or simultaneously several mutually alternative protocols. For example, value 00101101 means that the Q.293 1 protocol (0010110<u>1</u>), bootp protocol (001011<u>0</u>1), DSM-CC U-N protocol (0010<u>1</u>101) and other protocol 2 (00<u>1</u>01101) are all supported at the same time. Value 0x00 of code 0x81 in this example means that no protocol is supported.

The invention does not specify what MAC-layer messages are used in the negotiations about the support and selection of protocols between a central unit and terminal units. Below are some examples that can be applied in systems complying with existing standards or drafts for standards.

Indication of Protocol Support

In systems complying with the aforementioned standards or drafts for standards, a central unit's network interface may be called INA (Interactive Network Adapter) or NRC (Network Related Control). Similarly, a terminal unit's network interface may be called NIU (Network Interface Unit) or IIM (Interactive Interface Module). Message 201 in FIG. 2 may be a MAC Default Configuration message sent by INA/NRC, and message 202 may be a MAC Sign-On Response message sent by NIU/IIM. Message 201 then contains a code for signaling protocol support (above, 0x81) and an associated value that indicates the signaling protocols supported by the central unit. Similarly, message 202 contains a code for signaling protocol support and an associated value indicating the signaling protocol selected by the terminal unit. If the terminal unit does not support any of the protocols indicated by the central unit in the MAC Default Configuration message the terminal unit includes in the MAC Sign-On Response message the code for signaling protocol support and sets its value to zero. Alternatively, the terminal unit may send the MAC Sign-On Response message without the code for signaling protocol support and/or the associated value.

Changes in Protocols Supported

If a central unit's capability of supporting certain protocols changes, it can send in a MAC Transmission Control message a value representing the protocols supported after the change. If the change means that support for a particular protocol is removed, the bit representing that protocol is reset. Correspondingly, if support for a new protocol is started, a new 'one' bit appears in the code value. If the list of protocols supported after the change causes a conflict in a terminal unit (for example, a terminal unit does not support any one of the protocols supported after the change) the terminal unit can respond with a MAC Link Management Acknowledge message in which it includes after the signaling code a value wherein bits representing the protocols that cause the conflict are 'ones'. Alternatively, the terminal unit may indicate the conflict by sending a MAC Link Management Acknowledge message without the code for signaling protocol support and/or the associated value.

Inquiring Protocols Supported by Terminal Unit

A central unit may make an inquiry about the protocols supported by a terminal unit by sending a MAC Status Request message in which it includes the code values for the protocols which the inquiry is about. In response, the terminal unit sends a MAC Status Response message in which it includes the code values for the protocols it supports.

The table below illustrates an exemplary method of systematically specifying the contents of the fields which are used in MAC messages to exchange information about the support for connection setup and/or maintenance capabilities and their alternative implementation methods.

TABLE 2

| Field description | Bits | Bytes |
|---|---|---|
| Number_of_Capabilities | (8) | (1) |
| for (i=0; I<Number_of_Capabilities; i++) { | | |
|     Code | (8) | (1) |
|     Value | (8) | (1) |
| } | | |

Table 2 shows that a MAC message first contains a one-byte number which defines how many capabilities related to connection setup and/or maintenance are described in the MAC message in question. Let the value of that number be N, for example. Then follow N pairs of numbers wherein the first number is a code for a certain desired capability related to connection setup and/or maintenance and the second number is the value of that code.

Now an embodiment of the apparatus according to the invention will be described, shown as a simplified block diagram in FIG. 3. In principle, the figure may depict either a central unit or a terminal unit. Block 301 represents the physical part of a network interface, i.e. those known hardware elements which are needed to connect the apparatus with the transmission medium. A demultiplexer 302 extracts from the received information flow the transmitted data proper which is directed to a data sink 303, signaling information which is taken to a signaling unit 304, and MAC protocol layer information which is taken to a MAC block 305. The outgoing information flow comprises data to be transmitted produced by a data source 306, signaling information coming from the signaling unit 304, and MAC protocol layer information produced by the MAC block 305. The outgoing data are compiled in a multiplexing and addressing unit 307 which sends them via the physical interface part 301. Operation of the other blocks is controlled by a management block 308. Comparing the block diagram in FIG. 3 with FIG. 1, the entity comprising blocks 301, 302, 305 and 307 corresponds to the network interface 107, 108 or 109, and block 304 corresponds to the (network) signaling unit 105, 106 or 110.

Exchange of messages according to FIG. 2 produces the following actions between the blocks in FIG. 3:
management block 308 instructs MAC block 305 to establish a logical point-to-point connection,
MAC block 305 sends an inquiry to signaling unit 304 about the protocols supported by the apparatus,
MAC block 305 establishes a logical point-to-point connection by means of blocks 301 and 307, including in the establishment process information about the protocols supported by the apparatus,
MAC block 305 sets the operation of blocks 302 and 307 such that when the logical connection has been established, the data received through it is first taken in the signaling unit 304,
MAC block 305 informs the signaling unit 304 that the connection has been established, and
signaling unit 304 sets the operation of blocks 302 and 307 such that when the connection is used the data packets arriving through it are directed to the data sink 303, and the data produced by the data source 306 are correctly addressed and transmitted.

In FIG. 3, continuous lines represent data flow and broken lines represent control signal flow.

What is claimed is:

1. A method for establishing a signaling connection with a terminal (102, 103, 104) in a central unit (101) of a communications system, said terminal and central unit comprising a network interface (107, 108, 109) and signaling unit (105, 106, 110) characterized in that it comprises steps in which by communication between the central unit's network interface (107, 108) and the terminal's network interface (109), information is created about the signaling protocol supported by the terminal, and signaling is started using a signaling unit (105, 106) in the central unit that supports the same signaling protocol as the terminal, wherein:

a message (201) is sent from the central unit's network interface (107) to the terminal, indicating the signaling protocols supported by the central unit, in response to an answer message (202) sent by the terminal indicating the terminal's selection for signaling protocol, a connection is established (203, 204) between the central unit's network interface (107) and the central unit's signaling unit (105) that supports the signaling protocol chosen by the terminal, and a point-to-point signaling connection (205) is established between the central unit and the terminal using the signaling protocol selected by the terminal.

2. The method of claim 1, characterized in that said message (203) contains a code for signaling protocol support and an associated value which is a binary number and in which each bit represents a particular signaling protocol.

3. The method of claim 2, characterized in that in response to a situation in which the central unit's capability of supporting various signaling protocols changes, a change message is sent to the terminal indicating the signaling protocols supported by the central unit after the change.

4. The method of claim 1, characterized in that therein by means of communication according to the MAC protocol layer between the central unit's network interface (107, 108) and the terminal's network interface (109), information is created about the signaling protocol supported by the terminal, and signaling is started using a signaling unit (105, 106) in the central unit that supports the same CC protocol layer signaling protocol as the terminal.

5. A method for establishing a signaling connection with a central unit (101) in a terminal (102, 103, 104) of a communications system, said terminal and central unit comprising a network interface (107, 108, 109) and signaling unit (105, 106, 110), comprising steps in which in response to a message (201) sent by the central unit's network interface (107) indicating the signaling protocols supported by the central unit, an answer message (202) is sent from the terminal's interface (109) indicating the signaling protocol selected by the terminal when the terminal supports a signaling protocol mentioned in said message, or the incapability of the terminal of supporting a protocol indicated in the message when the terminal does not support any one of the signaling protocols mentioned in said message, and a connection is established (206, 207) between the terminal's network interface (109) and the terminal's signaling unit (110).

6. A method for establishing a signaling connection with a central unit (101) in a terminal (102, 103, 104) of a communications system, said terminal and central unit comprising a network interface (107, 108, 109) and signaling unit (105, 106, 110) characterized in that it comprises steps in which in response to a message (201) sent by the central unit's network interface (107) indicating the signaling protocols supported by the central unit, an answer message (202) is sent from the terminal's interface (109) indicating the signaling protocol selected by the terminal when the terminal supports a signaling protocol mentioned in said message, or the incapability of the terminal of supporting a protocol indicated in the message when the terminal does not support any one of the signaling protocols mentioned in said message, and a connection is established (206, 207) between the terminal's network interface (109) and the terminal's signaling unit (110), the method being further characterized in that in response to a situation in which a change message sent by the central unit indicating the signaling protocols supported by the central unit after a change causes a conflict, a message is sent to the central unit including a code for signaling protocol support and an associated value which is a binary number and in which each bit represents a particular signaling protocol and in which the bits that represent protocols that cause a conflict are set.

7. A central unit (101) in a communications system, comprising a signaling unit (105, 106) and a network interface (107, 108) characterized in that it is equipped so as to use in a signaling connection with a terminal of the communications system at least one signaling protocol, to which end it comprises means for indicating to the terminal the signaling protocols supported by the central unit, means for receiving from the terminal an indication about the capability of the terminal of supporting a particular one of the signaling protocols the central unit indicated to the terminal, and means for setting up a signaling connection via the central unit's network interface, using a selected signaling protocol between the central unit and the terminal and a signaling unit selected by the central unit, the central unit being adapted to select a signaling unit after having received said indication from the terminal.

8. A terminal (102, 103, 104) in a communications system, comprising a signaling unit (110) and a network interface (109), characterized in that it is equipped so as to use in a signaling connection with a central unit of a communications system at least one signaling protocol, to which end it comprises means for indicating to the central unit, in response to a message sent by the central unit, the capability of the terminal of supporting a particular signaling protocol by sending a message to the central unit including a code for signaling protocol support and an associated value which is a binary number and in which each bit represents a particular signaling protocol and in which the bits that represent protocols that cause a conflict are set, and establishing via a network interface in the terminal a signaling connection between a signaling unit in the terminal and the central unit, using a signaling protocol supported by the terminal.

9. The terminal of claim 8, wherein the signaling connection is between the central unit and the terminal.

10. A communications system (100) comprising a central unit (101) and terminals (102, 103, 104), characterized in that it is equipped so as to set up and maintain a signaling connection between the central unit and at least one terminal, using one signaling protocol, to which end it comprises
in the central unit, means for indicating to the terminal the signaling protocols supported by the central unit and means for setting up via the central unit's network interface a signaling connection using a selected signaling protocol between the central unit's signaling unit and the terminal, and
in the terminal, means for
indicating to the central unit the capability of the terminal of supporting a particular signaling protocol in response to a message sent by the central unit, and
setting up via a network interface in the terminal a signaling connection between a signaling unit in the terminal and the central unit, using a signaling protocol supported by the terminal.

11. The communications system of claim 10, characterized in that it is a multiple access network in which the physical connection (111) between the central unit and the terminals is one of the following: cable, optical fiber, combination of those, satellite link, terrestrial radio link, Local Multipoint Distribution connection, Microwave Multipoint Distribution System connection.

* * * * *

UNITED STATES PATENT AND TRADEMARK OFFICE
CERTIFICATE OF CORRECTION

| | |
|---|---|
| PATENT NO. | : 7,006,528 B1 |
| APPLICATION NO. | : 09/261017 |
| DATED | : February 28, 2006 |
| INVENTOR(S) | : H. Kokkinen |

It is certified that error appears in the above-identified patent and that said Letters Patent is hereby corrected as shown below:

At (56) References Cited, prior to line 6, please insert
  --5,610,910    3/1997        Focsaneanu et al--; and after line 11, please insert new text as follows:

--FOREIGN PATENT DOCUMENTS

EP    0606079 A1    07/1998
    WO    9830042 A2    07/1998--.

Signed and Sealed this

Twelfth Day of August, 2008

JON W. DUDAS
*Director of the United States Patent and Trademark Office*